Feb. 16, 1960 — R. S. THORNBURGH ET AL — 2,925,061
INDICATOR MECHANISM

Filed July 28, 1958 — 2 Sheets-Sheet 1

INVENTORS
Roy S. Thornburgh,
Carlton H. Holtslander, &
John C. Jurk
BY Hugh L. Fisher
ATTORNEY

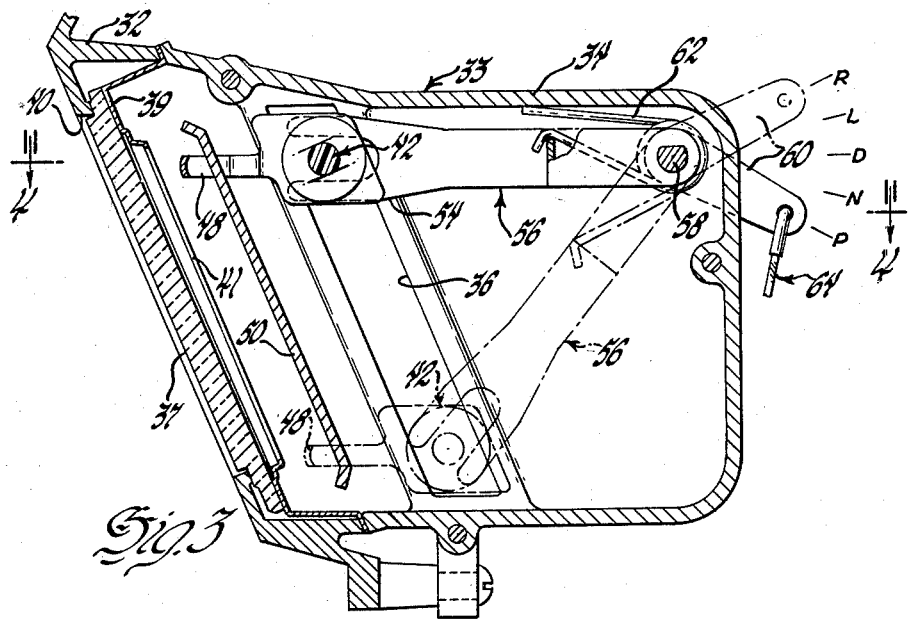
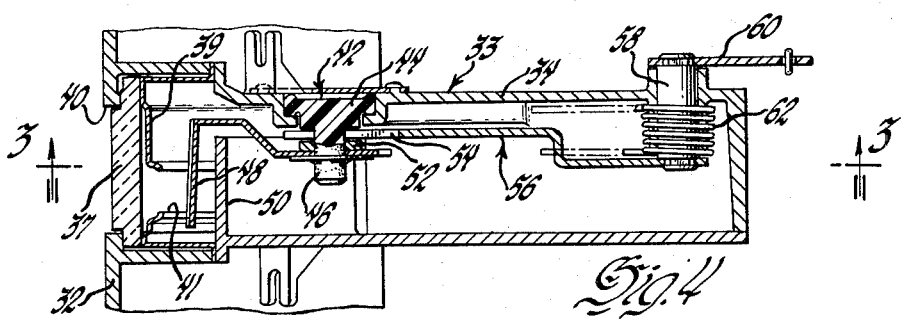
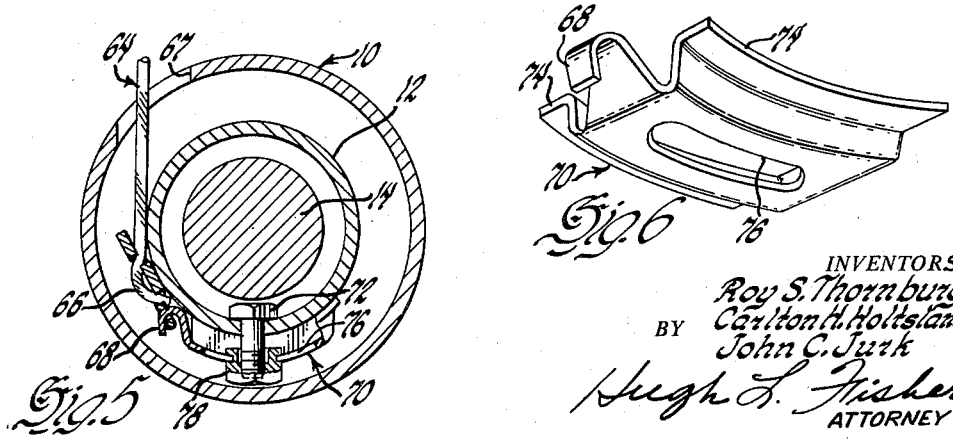

United States Patent Office 2,925,061
Patented Feb. 16, 1960

2,925,061

INDICATOR MECHANISM

Roy S. Thornburgh, Carlton H. Holtslander, and John C. Jurk, Flint, Mich., assignors to General Motors Corporation, Detroit, Mich., a corporation of Delaware Application July 28, 1958, Serial No. 751,447

1 Claim. (Cl. 116—124)

This invention relates to improvements in indicator mechanisms, and particularly, to indicator mechanisms adapted for use, although not exclusively, with vehicle transmissions.

In motor vehicles most of the gages, or similar devices, such as those indicating temperature, fuel, oil pressure, etc., are mounted preferably in a cluster on the instrument panel for easy visual inspection by the driver. For this reason, it is also desirable to include in this cluster the transmission indicator dial. However, when a conventional transmission control shaft of a character that is rotatably supported by the steering column is used, there is the problem of properly connecting the transmission control shaft to the indicator needle for the dial. Since mass production techniques must generally be considered, it is customary for the vehicle body with the instrument panel installed and the vehicle chassis with the steering column and transmission control shaft in place to be united during final assembly. Therefore, provision must be made for easy and quick connection of the indicator needle with the transmission control shaft at this time, as well as provision for adjustment.

Another problem arises, when the transmission indicator dial is mounted on the instrument panel, from the need to operate the indicator needle with the rotary movement of the transmission control shaft. If the indicator needle is likewise resolved, then the arc traversed by the needle becomes critical since the spacing of the legends on the dial and their size must be such that they can be easily seen from the driver's seat. As a result, much of the frontal area on the instrument panel is consumed by the arcuate dial which space could be otherwise used in compacting the instrument cluster. Additionally, multiple linkage is required for interconnecting the transmission control shaft and the indicator needle, if the space requirements for the needle arc do not permit a direct connection with the control shaft.

With these problems in mind, the invention contemplates provision of a vehicle transmission indicator mechanism that requires a minimum number of components, that may be installed on the vehicle instrument panel as a subassembly and thereafter adjustably connected to a steering column mounted transmission control, and that is compact structurally so as to require a minimum amount of the instrument panel frontal area.

Another objective of the invention, and related to the above, is to make the connection between the transmission control and the indicator mechanism through a cable which has one end affixed to the indicator mechanism and the other end constructed to be detachably secured to the transmission control.

Additionally, the invention affords a transmission indicator mechanism so constructed and arranged that rotary movement of the transmission control is translated into substantialy rectilinear movement of a dial indicator element.

The foregoing and other objects and advantages of the invention will be apparent from the following description and the accompanying drawings, in which:

Figure 3 is an enlarged sectional view of the indicator mechanism, similar to that shown in Figure 1, along line 3—3 of Figure 4;

Figure 4 is a sectional view of the mechanism along line 4—4 of Figure 3;

Figure 5 is a sectional view along line 5—5 of Figure 1 depicting the connection between a transmission control shaft and a cable to the indicator mechanism; and Figure 6 is a perspective view of a clip employed to make the conenction between the cable and the transmission control shaft.

Figure 1:
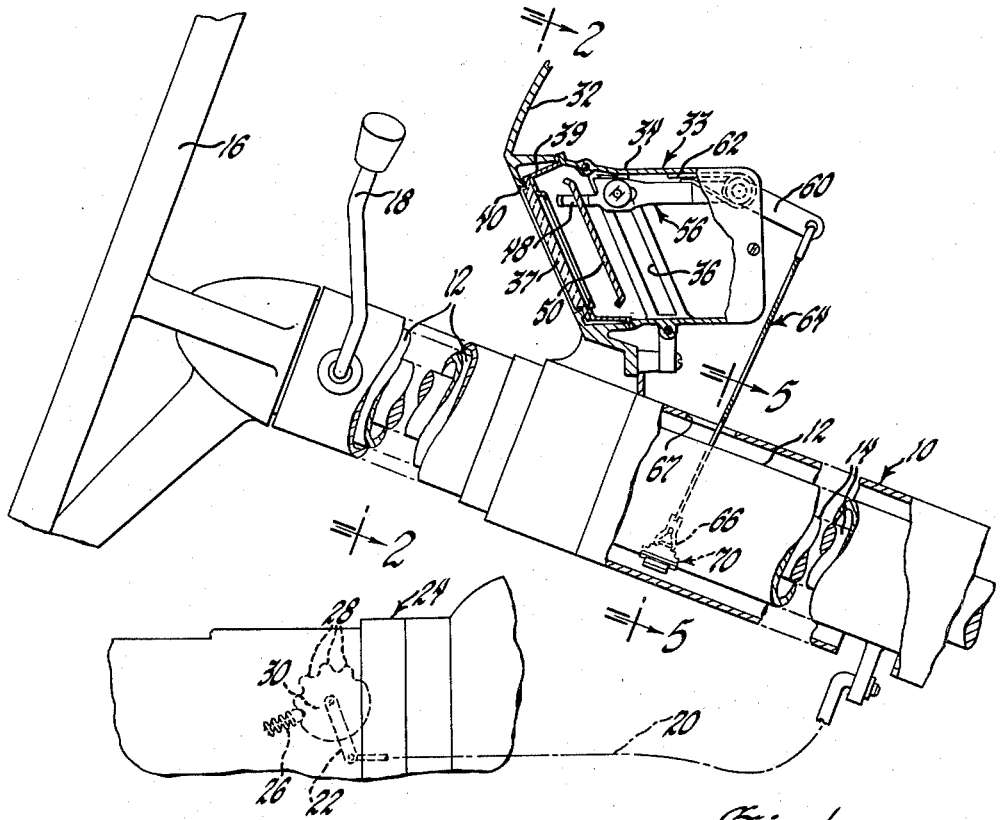
Figure 1 is an elevational side view demonstrating the disposition of a transmission indicator mechanism, incorporating the principles of the invention, relative to a vehicle steering column and transmission.

Referring to Figure 1 of the drawings, the numeral 10 designates a vehicle steering column of conventional construction which encloses and rotatably supports a transmission control shaft or tube 12 and a steering shaft 14. The steering shaft 14 is revolvably mounted inside the transmission control tube 12 and has the usual steering wheel 16 affixed to the upper end while the upper end of the transmission control tube 12 has a manual transmission shift lever 18 connected thereto. Rotation of the shift lever 18 to its various settings, e.g., Park, Neutral, Drive, Low, Reverse, etc., will, through appropriate linkage 20, or the equivalent, revolve a lever 22 and change the status of the transmission 24 to that corresponding to the shift lever setting in any well known manner.

The shift lever 18 is releasably held in each of its settings by a suitable detent, such as that shown at 26, arranged to engage a series of notches 28 in a sector 30 which is revolvable with the lever 22. Each of the notches represents one of the shift lever settings, and therefore, the detent 26 will offer some predetermined restraint adequate to afford the driver a sensation or feel in each setting when he moves the shift lever 18.

Figure 2:
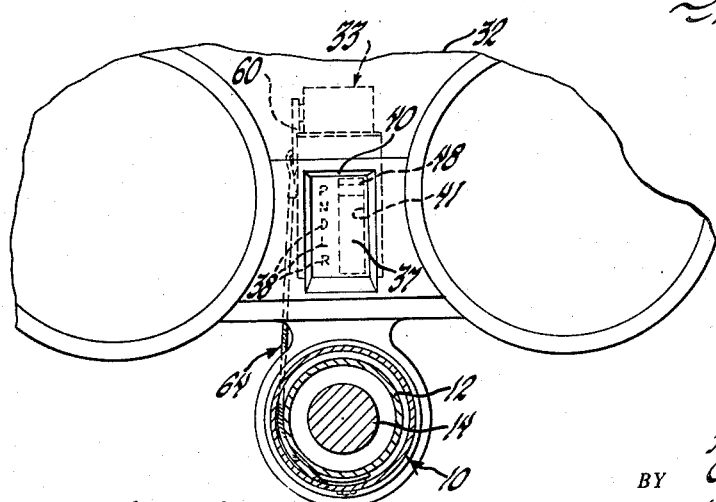
Figure 2 is a view of the indicator mechanism dial, looking in the direction of the arrows 2—2 in Figure 1.

As viewed in Figures 1 and 2, an instrument panel, denoted generally at 32, is situated above the steering column column 10 and includes an indicator mechanism 33 enclosed within a housing 34, as well as provision for the various operating gages, such as those for oil pressure, fuel and temperature. The housing 34, which may be formed integral with the instrument panel 32, or seperately, so as to be suitable for bench assemblies, includes a guide track 36 formed as a substantially straight grooved slot along one side thereof. An indicator dial 37, displayed at the front of the housing 34, is made of appropriate transparent material with legends 38 corresponding to the different transmission settings imprinted thereon, as seen in Figure 2. The dial 37 is supported at the back side by a retainer 39 that affixes to the housing 34 while on the visual side is outlined by the edges of an opening 40 in the instrument panel 32. As seen in Figure 2, the retainer 39 is secured to the housing 34 so that the dial 37 is in a plane parallel to the track 36 and is provided with an elongated rectangular opening 41 adjacent the legends 38. The function of opening 41 is to permit illumination of the legends 38 by a suitable source (not shown).

Slidable on the guide track 36 is a carrier 42 made of some inexpensive bearing material, e.g., nylon. The carrier 42 is formed with a body section 44 that seats in the guide track 36 and a shaft section 46 which extends inwardly therefrom. The axial position of the carrier 42 is maintained by an L-shaped indicator needle 48 which attaches to the carrier shaft section 46 and which extends around a housing separating wall 50 so as to be opposite the dial legends 38. Cooperating with the indicator needle 48 to maintain the position of the carrier 42 are a spacer 52 and a bifurcated end 54 of a transfer lever 56 fitted between the indicator needle 48 and the carrier body section 44.

With reference to Figure 2, it can be seen that, as the carrier 42 moves up and down in the guide track 36, the indicator needle 48 will move therewith along a substantially rectilinear path to positions opposite the different legends 38. A spring 62, best shown in Figure 3, is arranged to urge the transfer lever 56 downwardly to the dotted line position herein represented as the Reverse setting.

The transfer lever 56 is secured at the end opposite the bifurcated end 54 to the inside of a stub shaft 58 which is journaled in the housing 34 whereas the outside of the stub shaft 58 has attached thereto an actuating arm 60. The length of the transfer lever 56 determines the distance that the carrier 42 will travel when the transfer lever 56 is pivoted while the bifurcated end 54 offers a lost motion connection that allows the rotary movement of the transfer lever 56 to be translated into rectilinear movement of the carrier 42 along guide track 36.

As so far described, a complete indicator mechanism sub-assembly is afforded which may preferably be built up separately from the instrument panel 32 and subsequently installed thereon before a connection with the transmission control tube 12 is made. To make this connection, a cable 64 is utilized which has the upper end joined to the actuating arm 60. The lower end of the cable 64, as depicted in Figures 1 and 5, is formed into a loop at 66 and extends through a peripheral opening 67 in the steering column 10. Loop 66 forms a quick detachable connection with a hook 68 on an adjusting clip 70 secured to the periphery of the transmission control tube 12 by a bolt 72. The cable 64 may be attached to arm 60 so as to be a part of the sub-assembly or attached later when the cable 64 is connected to the clip 70. With reference to Figure 6, the adjusting clip 70 has opposite bearing flanges 74 shaped to have the same contour as the tube 12 and has an elongated slot 76 carrying a lock nut 78 for the bolt 72. When the lock nut 78 is loosened, the adjusting clip 70 can be shifted to the extent permitted by the elongated slot 76. Hence, to make an adjustment, the transmission control tube 12 is placed in the same transmission setting as the indicator needle 48, for instance, the Reverse setting, and the clip 70 is moved until the slack is removed from the cable 64 and the spring 62 becomes effective to hold the cable 64 in tension.

To briefly summarize, when sufficient force is applied to the shift lever 18 to release detent 26 and revolve the transmission control tube 12 clockwise, as viewed in Figure 2, from, e.g., the Park setting to any of the lower settings on the dial 37, the spring 62 will be effective because of the release of restraint to shift, through the transfer lever 56, the carrier 42, and accordingly, the indicator needle 48 downwardly to the next setting established by the detent 26 while still maintaining cable 64 in tension. When the transmission control tube 12 is rotated counterclockwise by the shift lever 18, the operator must overcome both the detent 26 and the bias from the spring 62 with the resultant pull being transferred by the cable 64 to the transfer lever 56. This will move the carrier 42 as well as the indicator needle 48 upwardly to the chosen setting.

From the foregoing, it can be seen that with up and down rectilinear movement of the indicator needle 48 considerably less of the frontal face area of the instrument panel 32 is required than when the indicator needle traverses an arc similar to that of the transmission control tube 12. With this rectilinear travel, the transfer lever 56 rotates in a vertical plane and therefore the extent of rotation in this plane is not as critical, such space normally being inherently available from the contour of the instrument panel 32. Furthermore, by making the indicator mechanism 33 as a sub-assembly, attachment of the indicator mechanism 33 to the transmission control tube 12 simply requires the positioning of the cable loop 66 over the hook 68 on the adjusting clip 70 at final vehicle assembly when the vehicle body is installed on the chassis. The transfer lever 56 being, as depicted in Figure 3, biased to the Reverse setting by the spring 62, offers an initial setting for adjustment purposes so that all that need be done is to place the transmission control tube 12 in the same setting and shift the adjusting clip 70 until the slack is removed from the cable 64.

The invention is to be limited only by the following claim.

An indicator mechanism for a vehicle transmission control having a transmission control shaft revolvably positionable within the vehicle steering column to a plurality of transmission settings, comprising a dial located on an instrument panel extending generally transversely in said vehicle, said dial having a series of linearly spaced representations corresponding to the transmission settings, a support adjacent said dial extending forwardly from said instrument panel substantially along the longitudinal axis of said vehicle, said support having a guide track having a centerline substantially parallel to the linearly spaced representations of the dial, an indicator means guided by and supported on said track, said indicator means having a pointer cooperating with said dial to give to the vehicle driver a visual indication of the transmission setting, said indicator means further having a shaft section extending perpendicular to the plane of said track, a transfer lever pivotally mounted on said support, said transfer lever having a bifurcated end portion cooperating with the shaft section to cause movement of the indicator means along the track in response to pivotal movement of said lever, a clip formed with a hook end adjustably secured to said transmission control shaft, a cable having an end joined to said transfer lever and means releasably joining the other end to said hook end, said other end of the cable formed into a tortuous path to secure the cable to the last-named means, and torsion spring means supported on the axis of the pivot of the transfer lever and having two ends engaging the support and the transfer lever respectively to bias the transfer lever in a cable tensioning direction.

References Cited in the file of this patent

UNITED STATES PATENTS

| 1,876,824 | Adam | Sept. 13, 1932 |
| 2,732,905 | Anderson | Jan. 31, 1956 |
| 2,737,147 | Bliss | Mar. 6, 1956 |